Patented Nov. 8, 1938

2,135,980

UNITED STATES PATENT OFFICE 2,135,980

REFINING OF CELLULOSE DERIVATIVES

Carl J. Malm, Rochester, N. Y., assignor to Eastman Kodak Company, Rochester, N. Y., a corporation of New Jersey No Drawing. Application October 28, 1936, Serial No. 108,051

4 Claims. (Cl. 260—102)

The present invention relates to the refining of cellulose derivatives in solid form by moistening with aqueous hydrogen peroxide of .2-5% concentration to render the material entirely free from color.

In the manufacture of cellulose derivatives, particularly cellulose acetate, various impurities may be evidenced in the final product either from the raw materials which are employed or occasionally from materials with which the reaction mixture comes in contact. As a consequence, the cellulose derivative may have a slight coloration which may show in the commercial use of the derivative. Various means of cancelling this color have been proposed, such as bleaching of the cellulose before its conversion into a derivative or treatment of the cellulose derivative with a chlorinating compound or ozone, while still dissolved in its reaction mixture. In the former case some of the more seriously objectionable coloring materials are removed, however, other objectionable impurities are merely hidden from view by the bleaching of the cellulose and later evidence themselves in the derivative which is formed therefrom.

It has been attempted to remove this objectionable coloration, especially in the case of cellulose acetate, by incorporating hydrogen peroxide into its solution in the esterification mixture, particularly as a partial or complete substitute for the water in the hydrolysis step. This treatment has the disadvantages that the cellulose material must subsequently be washed which washing incorporates color therein, and, therefore, the benefits of the hydrogen peroxide treatment is lost.

One object of my invention is to provide a method of bleaching cellulose derivatives, especially the organic acid esters of cellulose, such as cellulose acetate in solid form, so that it may thereafter be suitable for use either in processes in which the ester is to be dissolved and then colloidized or processes in which the material is to be pressed or molded. Another object of my invention is to provide a process for bleaching cellulose derivatives, particularly cellulose acetate, in which the washing of the derivative after the treatment with hydrogen peroxide is unnecessary. A further object of my invention is to provide a bleaching process with a bleaching material which will not degrade the cellulose except under very sarious conditions. Further objects of my invention will appear herein.

I have found that if a cellulose derivative, such as cellulose acetate, is moistened with aqueous hydrogen peroxide of .2-5% concentration and allowed to stand a short time and then dried without washing, the coloration of the cellulose acetate and any further danger of coloration is eliminated. If the cellulose acetate is in moist condition, obviously the concentration of hydrogen peroxide should be higher to assure treatment with hydrogen peroxide of sufficient strength to adequately decolorize the cellulose derivative which is being treated. After the derivative has been moistened with the hydrogen peroxide, it is allowed to stand for but a short time and then dried. It is not necessary that this drying be carried to the point where a bone-dry product results and it is not harmful if some of the hydrogen peroxide remains in contact with the cellulose derivative for a much longer period. My invention is eminently suitable for the treatment of an organic acid ester of cellulose, such as cellulose acetate, which has been ground to a powder for molding purposes. Not only might original coloring impurities be present but also this grinding usually introduces a certain amount of color into the product. If a powdered cellulose acetate, such as described, is impregnated with a hydrogen peroxide solution and dried after this treatment, without washing, a product of excellent color is obtained. In the case of molding powders, it is preferable to treat the powder before the plasticizer is added thereto.

The following example illustrates my invention as applied to cellulose acetate molding powder:

100 grams of cellulose acetate powder ground to 80 mesh, was impregnated with a 3% water solution of hydrogen peroxide. The amount of moistening material was approximately equal to that of the acetate powder which was moistened. The powder was left standing for one hour and was then dried at 160° F. 35 parts of tripropionin was incorporated therein and the resulting mixture was molded. A product was obtained which was entirely free from color.

The concentration of hydrogen peroxide employed may be varied depending upon the amount of color which is present in the cellulose derivative. With the amount of color which is usually found in the ordinary cellulose derivative incorporation of aqueous hydrogen peroxide of .2-5% concentration is usually sufficient to entirely eliminate the color. If, however, the coloring is exceptionally bad, the concentration may be increased above 5% and the drying in that case is preferably carried out at a temperature below 160° F. to avoid degradation of the cellulose derivative.

As pointed out above, my invention is particularly concerned with the bleaching of the organic acid esters of cellulose such as cellulose acetate, cellulose acetate propionate, cellulose acetate butyrate, cellulose propionate and cellulose butyrate. Not only is my invention suitable however for these derivatives but also for cellulose ethers, such as ethyl cellulose and cellulose esters generally which contain objectionable coloring material.

Although my invention has been specifically illustrated with a powdered cellulose ester, it is to be understood that the ester may be in fibrous rather than pulverulent form. When fibrous the ester is of a more absorbent nature than when powdered and therefore more of the aqueous hydrogen peroxide will be necessary to assure uniform distribution.

As my process eliminates the necessity of washing the cellulose derivative after treating with hydrogen peroxide there is no danger of color being imparted thereto by contacting with ordinary washing water. Although washing is unnecessary, it is not objectionable, if desired, to wash the derivative with distilled or purified water after the bleaching treatment and is to be understood as not excluded by the claims. As washing involves additional handling and thereby adds to the cost of refining the derivative, in practice it is preferred not to wash subsequent to the hydrogen peroxide treatment.

I claim:

1. The method of refining a cellulose derivative to remove objectionable coloration therefrom which comprises treating the derivative in solid form with a liquid essentially consisting of aqueous hydrogen peroxide of .2–5% concentration, which will render the derivative free of color, and without washing, drying the cellulose derivative.

2. The method of refining an organic acid ester of cellulose to remove objectionable coloration therefrom which comprises treating the cellulose ester in solid form with a liquid essentially consisting of aqueous hydrogen peroxide of .2–5% concentration, which will render the derivative free of color, and without washing, drying the cellulose derivative.

3. The method of refining cellulose acetate in solid form to remove objectionable coloration therefrom which comprises treating it with a liquid essentially consisting of aqueous hydrogen peroxide of .2–5% concentration, which will render the derivative free of color, and without washing, drying the cellulose derivative.

4. The method of refining cellulose acetate powder to remove objectionable coloration therefrom which comprises treating it with a liquid essentially consisting of aqueous hydrogen peroxide of approximately 3% concentration, which will render the powder free of color, and without washing, drying the powder at 160° F.

CARL J. MALM.